(12) United States Patent
Tasaki et al.

(10) Patent No.: US 10,650,535 B2
(45) Date of Patent: May 12, 2020

(54) MEASUREMENT DEVICE AND MEASUREMENT METHOD

(71) Applicant: KABUSHIKI KAISHA TOSHIBA, Tokyo (JP)

(72) Inventors: Tsuyoshi Tasaki, Kanagawa (JP); Manabu Nishiyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 186 days.

(21) Appl. No.: 15/257,221

(22) Filed: Sep. 6, 2016

(65) Prior Publication Data

US 2017/0084048 A1 Mar. 23, 2017

(30) Foreign Application Priority Data

Sep. 17, 2015 (JP) .................................. 2015-183874

(51) Int. Cl.
*G06T 7/246* (2017.01)
*G06T 7/73* (2017.01)

(52) U.S. Cl.
CPC ................ *G06T 7/246* (2017.01); *G06T 7/73* (2017.01); *G06T 2207/10016* (2013.01); *G06T 2207/30261* (2013.01)

(58) Field of Classification Search
CPC .... G06T 7/60; G06T 7/70; G06T 2207/10012
See application file for complete search history.

(56) References Cited

U.S. PATENT DOCUMENTS

| 6,535,114 | B1 * | 3/2003 | Suzuki | G06T 7/20 340/435 |
| 7,561,720 | B2 * | 7/2009 | Miyahara | G06T 7/74 348/140 |
| 8,456,527 | B2 * | 6/2013 | Elangovan | G06K 9/6202 348/142 |
| 8,559,674 | B2 * | 10/2013 | Uchida | B60R 1/00 382/106 |
| 9,430,850 | B1 * | 8/2016 | Domanski | G06T 7/60 |

(Continued)

FOREIGN PATENT DOCUMENTS

| JP | 2004-203068 | 7/2004 |
| JP | 2009-186353 | 8/2009 |

(Continued)

*Primary Examiner* — Christopher S Kelley
*Assistant Examiner* — Boubacar Abdou Tchoussou
(74) *Attorney, Agent, or Firm* — Finnegan, Henderson, Farabow, Garrett & Dunner, L.L.P.

(57) ABSTRACT

According to an embodiment, a measurement device includes a processing circuitry. A plurality of images are captured in time series by an image capturing unit installed in a moving object. The processing circuitry identifies a region in which other moving object moving in surroundings of the moving object is present for each of the images, based on position and direction information of the moving object, and moving object information of the other moving object. The processing circuitry estimates position and posture of the image capturing unit based on the images. The processing circuitry searches for sets of corresponding points among non-moving object regions in the respective images. The processing circuitry performs 3D measurement based on the position and posture of the image capturing unit and the sets of the corresponding points.

13 Claims, 11 Drawing Sheets

(56) References Cited

U.S. PATENT DOCUMENTS

| | | | |
|---|---|---|---|
| 9,589,193 B2* | 3/2017 | Fukata | G06K 9/00825 |
| 10,024,965 B2* | 7/2018 | Nehmadi | G01S 17/08 |
| 2005/0244034 A1* | 11/2005 | Miyahara | G06T 7/74 |
| | | | 382/106 |
| 2007/0236561 A1* | 10/2007 | Anai | G06T 7/74 |
| | | | 348/46 |
| 2010/0226544 A1* | 9/2010 | Uchida | B60R 1/00 |
| | | | 382/107 |
| 2011/0069951 A1 | 3/2011 | Son et al. | |
| 2013/0236107 A1* | 9/2013 | Fukaya | G06K 9/46 |
| | | | 382/201 |
| 2013/0279917 A1 | 10/2013 | Son et al. | |
| 2014/0309841 A1* | 10/2014 | Hara | G05D 1/024 |
| | | | 701/26 |
| 2015/0057871 A1* | 2/2015 | Ono | G01C 21/34 |
| | | | 701/23 |
| 2015/0324651 A1* | 11/2015 | Fukata | G06K 9/00825 |
| | | | 348/148 |
| 2015/0334269 A1* | 11/2015 | Yokota | G06K 9/00805 |
| | | | 382/103 |
| 2016/0133128 A1* | 5/2016 | Koo | G06K 9/00805 |
| | | | 701/117 |
| 2016/0292905 A1* | 10/2016 | Nehmadi | G01S 17/08 |

FOREIGN PATENT DOCUMENTS

| | | |
|---|---|---|
| JP | 2013-504971 | 2/2013 |
| JP | 2013-134609 | 7/2013 |
| JP | 2014-142241 | 8/2014 |
| WO | WO 2011/034390 | 3/2011 |

\* cited by examiner

MEASUREMENT DEVICE AND MEASUREMENT METHOD

CROSS-REFERENCE TO RELATED APPLICATION

This application is based upon and claims the benefit of priority from Japanese Patent Application No. 2015-183874, filed on Sep. 17, 2015; the entire contents of which are incorporated herein by reference.

FIELD

An embodiment described herein relates generally to a measurement device and a measurement method.

When other moving object is present in captured images, the conventional techniques, however, cause accuracy of three-dimensional measurement to deteriorate because the position of the other moving object differs among the images as a result of the movement of the other moving object.

BACKGROUND

Techniques have been known that implement three-dimensional measurement using a plurality of images captured in time series by a camera installed in a moving object such as a vehicle that is running and a movement amount of the moving object.

BRIEF DESCRIPTION OF THE DRAWINGS

FIG. 16 is an explanatory view illustrating an example of the advantages of the embodiment.

DETAILED DESCRIPTION

According to an embodiment, a measurement device includes a processing circuitry. The processing circuitry acquires a plurality of images captured in time series by an image capturing unit installed in a moving object. The processing circuitry acquires first position information that indicates a position of the moving object and first direction information that indicates a direction of the moving object. The processing circuitry acquires moving object information that includes second position information indicating a position of other moving object moving in surroundings of the moving object. The processing circuitry identifies a moving object region in which the other moving object is present for each of the images, based on the first position information, the first direction information, and the moving object information. The processing circuitry estimates a position and a posture of the image capturing unit based on the images. The processing circuitry searches for a plurality of sets of corresponding points among non-moving object regions other than the moving object regions in the respective images. The processing circuitry performs three-dimensional measurement based on the position and the posture of the image capturing unit and the sets of the corresponding points.

The following describes an embodiment in detail with reference to the accompanying drawings.

Figure 1:
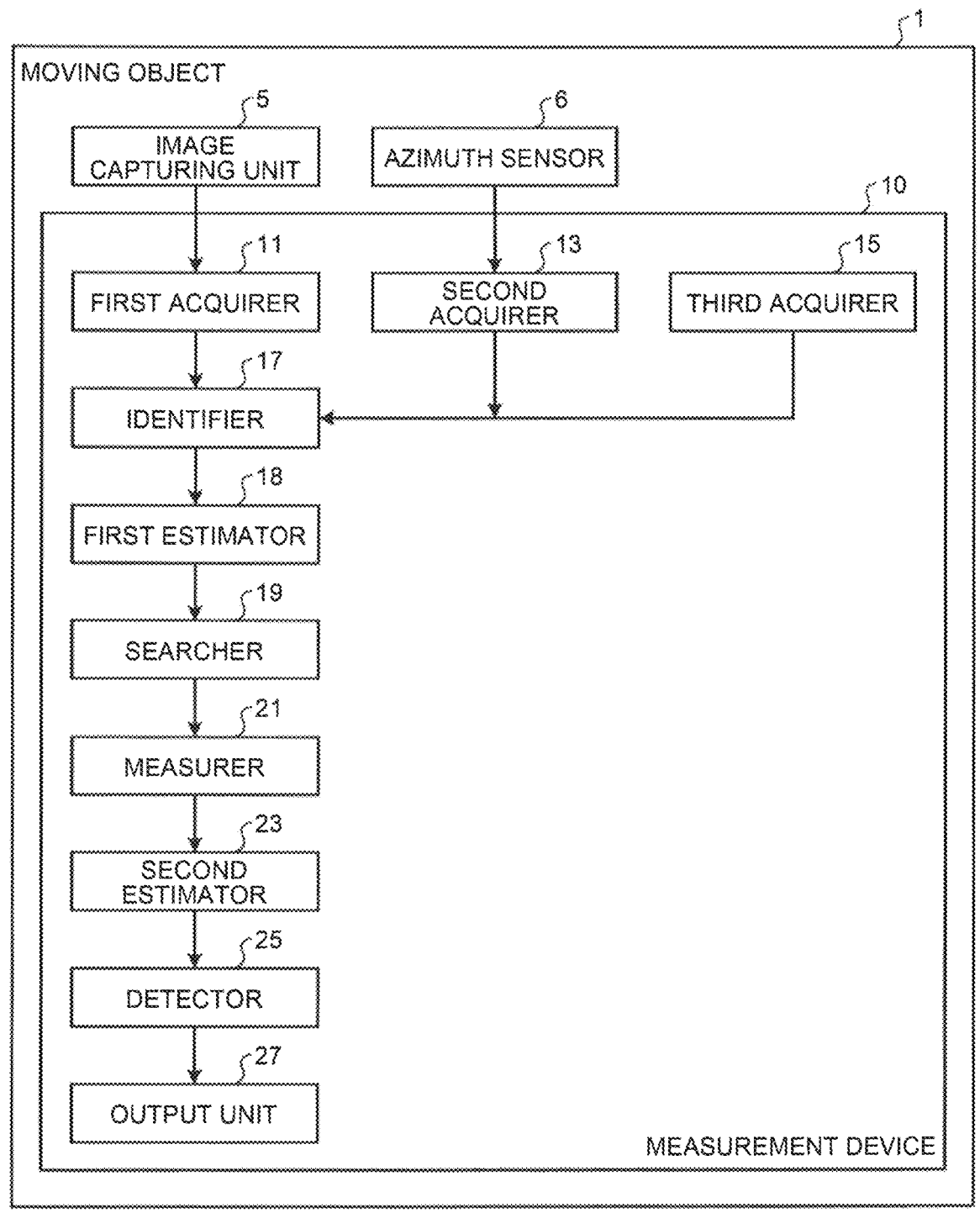
FIG. 1 is a schematic diagram illustrating exemplary structures of a measurement device and a moving object in an embodiment.
Figure 2:
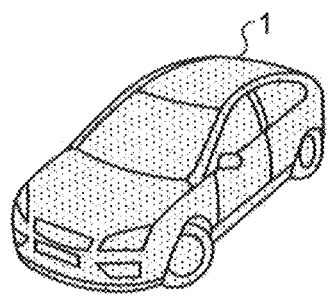
FIG. 2 is a schematic diagram illustrating an example of the moving object in the embodiment.

FIG. 1 is a schematic diagram illustrating an exemplary structure of a measurement device 10 according to the embodiment and an exemplary structure of a moving object 1 provided with the measurement device 10. FIG. 2 is a schematic diagram illustrating an example of the moving object 1 in the embodiment. As illustrated in FIG. 1, the measurement device 10 is installed in the moving object 1 that includes an image capturing unit 5 and an azimuth sensor 6. The measurement device 10 includes a first acquirer 11, a second acquirer 13, a third acquirer 15, an identifier 17, a first estimator 18, a searcher 19, a measurer 21, a second estimator 23, a detector 25, and an output unit 27.

In the embodiment, the moving object 1 is a vehicle such as a motor vehicle that moves on a road surface serving as a movement plane, for example. The moving object 1 is, however, not limited to this example. The moving object 1 may be any object that can move on the movement plane. For example, the moving object 1 may be a ship that moves on a water surface serving as the movement plane or a robot that moves on a floor surface serving as the movement plane.

The image capturing unit 5 can be achieved by an image sensor or a camera, for example. The image capturing unit 5 captures images of the surroundings (e.g., in a traveling direction of the moving object 1) of the moving object 1 in time series and outputs a plurality of captured images to the measurement device 10.

The azimuth sensor 6 detects a direction of the moving object 1 and outputs, to the measurement device 10, first position information that indicates the detected direction of the moving object. 1

The first acquirer 11, the second acquirer 13, the third acquirer 15, the identifier 17, the first estimator 18, the searcher 19, the measurer 21, the second estimator 23, the detector 25, and the output unit 27 may be achieved by a processing unit such as a central processing unit (CPU) executing a program, i.e., by software, by hardware such as an integrated circuit (IC), or by both of the software and the hardware. The measurement device 10 may be achieved by a chip (integrated circuit) or a typical computer.

The first acquirer 11 acquires, from the image capturing unit 5, the multiple images captured in time series.

The second acquirer 13 sequentially acquires the first position information that indicates the position of the moving object 1 and first direction information that indicates the direction of the moving object 1. The second acquirer 13 acquires the first position information from the global positioning system (GPS) satellites and the first direction information from the azimuth sensor 6, for example. The acquisition manner of the first position information and the first direction information is not limited to the example.

Figure 3:
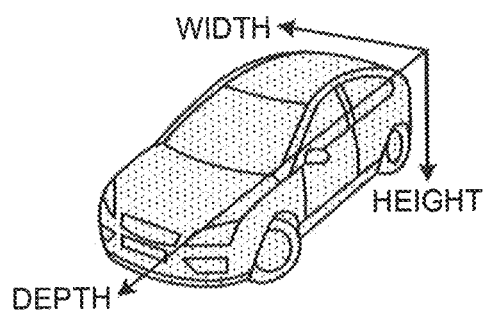
FIG. 3 is a schematic diagram illustrating an example of model information in the etch embodiment.

The third acquirer 15 acquires information about other moving object (hereinafter referred to as moving object information). The moving object information includes second position information indicating the position of other moving object moving in the surroundings of the moving object 1. The moving object information may further include at least one of speed information that indicates a speed of the other moving object, model information that indicates a model obtained by abstracting a shape of the other moving object, texture information that indicates at least one of a color and a pattern of the other moving object, and second direction information that indicates a direction of the other moving object. The model information may indicate at least one of the width, the height, and the depth (the length) of the other moving object as illustrated in FIG. 3. In this case, the model information indicates a model obtained by abstracting the shape of the other moving object to a rectangular parallelepiped. The model information may indicate a model of a cube obtained by multiplying any length of the width, the height, and the depth of the other moving object by a constant, or a model of a rectangular parallelepiped obtained by estimating a length of the other side from any length of the width, the height, and the depth of the other moving object using a general aspect ratio of a vehicle.

The third acquirer 15 sequentially acquires the moving object information from other moving object by performing inter-vehicle communication (e.g., wireless communication according to IEEE 802.21p) with the other moving object running in the surroundings of the moving object 1, for example. In this case, the other moving object acquires the second position information from the GPS satellites, puts the acquired second position information in the moving object information, and transmits the moving object information to the moving object 1 (the measurement device 10), for example. The other moving object may detect a speed thereof, produce the speed information, and put the produced speed information in the moving object information. When preliminarily holding the model information and the texture information thereof, the other moving object may put them in the moving object information. The other moving object may acquire the second direction information from an azimuth sensor included therein, and put the acquired second direction information in the moving object information.

The third acquirer 15 may sequentially acquire the moving object information from the other moving object moving in the surroundings of the moving object 1 from a monitoring device by performing road-vehicle communication (e.g., wireless communication according to IEEE 802.21p) with the monitoring device present on a road shoulder in the surroundings of the moving object 1. The monitoring device is a monitoring camera, for example. The monitoring device is, however, not limited to the example. In this case, the monitoring device captures an image of the other moving object moving in the surroundings of the moving object 1, calculates the second position information using the captured image, puts the calculated second position information in the moving object information, and transmits the moving object information to the moving object 1 (the measurement device 10). The monitoring device may use the position information about the monitoring device acquired from the GPS satellites for calculating the second position information. The monitoring device may calculate the model information, the texture information, and the second direction information using the captured image, and put the calculated information in the moving object information.

The identifier 17 identifies a moving object region in which the other moving object is present for each of the multiple images acquired by the first acquirer 11 on the basis of the first position information and the first direction information that are acquired by the second acquirer 13 and the moving object information acquired by the third acquirer 15.

Specifically, the identifier 17 determines that the other moving object is moving when a speed indicated by the speed information included in the moving object information is equal to or larger than a first threshold. When no speed information is included in the moving object information, the identifier 17 may calculate a speed to be included in the moving object information from a difference between the position indicated by the second position information included in the moving object information at this time and the position indicated by the second position information included in the moving object information at previous time, and an acquisition interval of the moving object information.

When determining that the other moving object is moving, the identifier 17 identifies the position of the other moving object on an image acquired by the first acquirer 11 on the basis of the first position information and the first direction information that are acquired by the second acquirer 13 and the second position information included in the moving object information acquired by the third acquirer 15. The identifier 17 can identify a positional relation between the moving object 1 and the other moving object on an image captured by the image capturing unit 5 of the moving object 1 because the position and the direction of the moving object 1 and the position of the other moving object are known, thereby making it possible to identify the position of the other moving object on the image. The first position information, the first direction information, the moving object information, and the image are captured at substantially the same time.

The identifier 17 further identifies the moving object region in which the other moving object is present on the image on the basis of the identified position of the other moving object on the image.

Specifically, the identifier 17 identifies, as the moving object region, a region having a predetermined size based on the identified position of the other moving object. For example, the identifier 17 identifies, as the moving object region, a region that includes the identified position of the other moving object as the center and the predetermined number of pixels. The moving object region may have any shape such as rectangular or circular.

Figure 4:
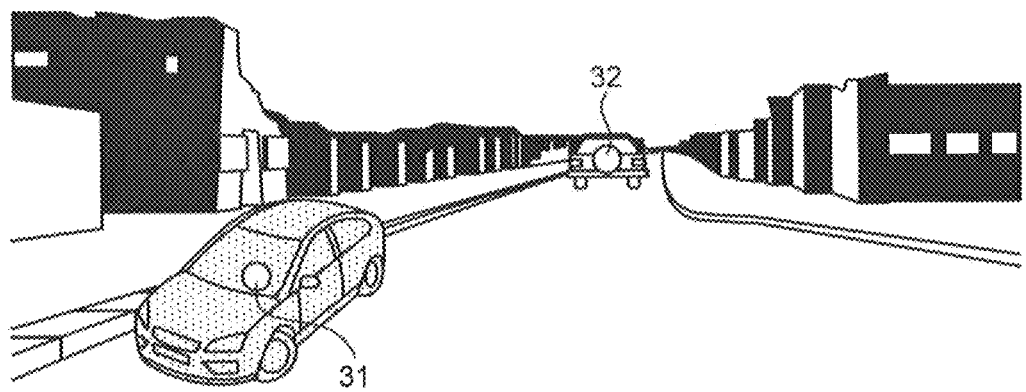
FIG. 4 is a schematic diagram illustrating an exemplary image in the embodiment.
Figure 5:
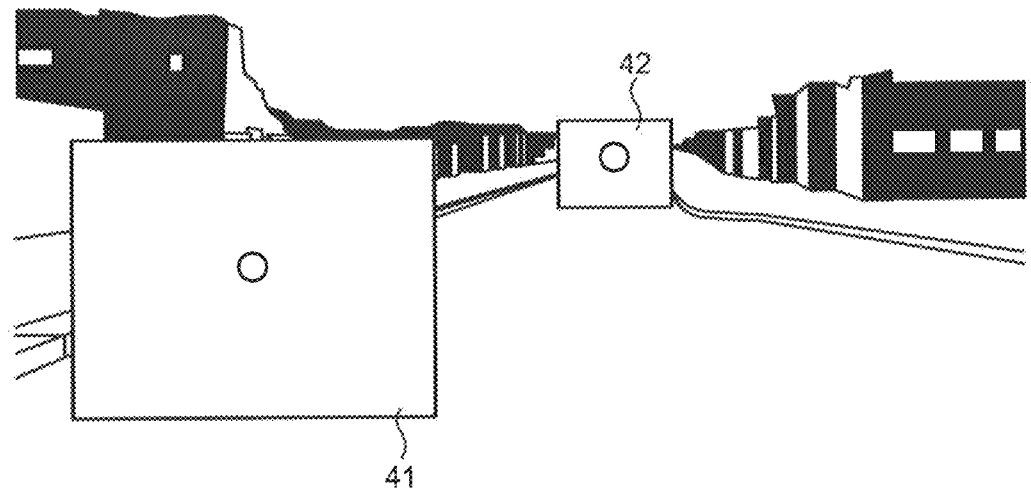
FIG. 5 is an explanatory view illustrating an example of identifying moving object regions in the embodiment.

The identifier 17 may identify, as the moving object region, a region that has a size according to a distance between the moving object 1 and the other moving object based on the identified position of the other moving object. For example, when identifying the positions (center positions) of moving bodies 31 and 32 serving as the other moving bodies as illustrated in FIG. 4, the identifier 17 may identify a moving object region 41 having the position of the moving object 31 as the center thereof and a moving object region 42 having the position of the moving object 32 as the center thereof as illustrated in FIG. 5. In the examples illustrated in FIGS. 4 and 5, the size (the number of pixels) of the moving object region 42 is smaller than that of the moving object region 41 because the distance from the moving object 1 to the moving object 32 is larger (farther) than that from the moving object 1 to the moving object 31. The distance between the moving object 1 and the other moving object is obtained on the basis of the first position information and the corresponding second position information.

The identifier 17 may identify, as the moving object region, a region according to the model of the other moving object based on the identified position of the other moving object. The identifier 17 may identify, as the moving object region, a region according to the direction of the other moving object. The identifier 17 may identify, as the moving object region, a region according to the distance between the other moving object and the moving object 1. For example, when identifying the positions (center positions) of the moving bodies 31 and 32 serving as the other moving bodies as illustrated in FIG. 4, the identifier 17 may identify a moving object region 51 having the position of the moving object 31 as the center thereof and a moving object region 52 having the position of the moving object 32 as the center thereof as illustrated in FIG. 6.

Figure 6:
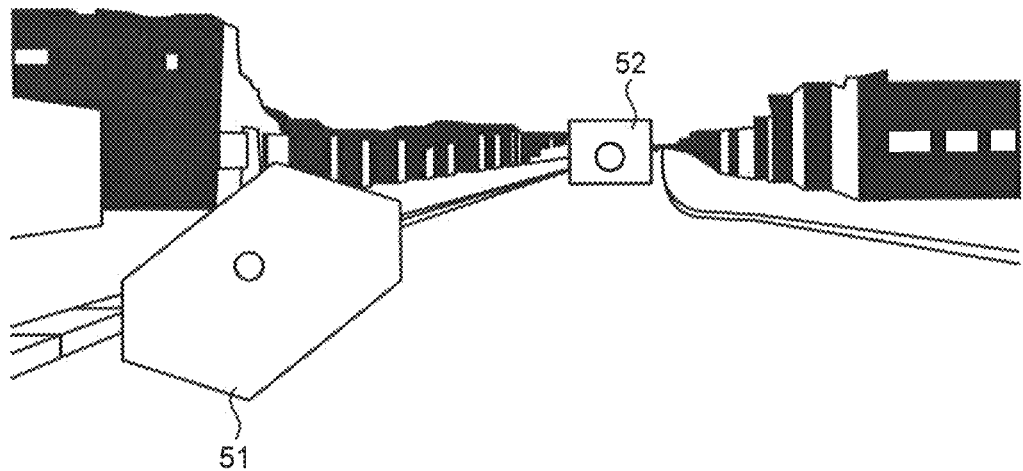
FIG. 6 is an explanatory view illustrating other example of identifying the moving object regions in the embodiment.

In the example illustrated in FIG. 6, the moving object region 51 is identified according to the model and the direction of the moving object 31 and the distance between the moving object 31 and the moving object 1. Specifically, the moving object region 51 is identified in such a manner that the model and the direction of the moving object 31 are set in a three-dimensional space and the model is projected such that the moving object 31 is positioned at the center of the moving object region 51. Likewise, the moving object region 52 is identified according to the model and the direction of the moving object 32 and the distance between the moving object 32 and the moving object 1. Specifically, the moving object region 52 is identified in such a manner that the model and the direction of the moving object 32 are set in a three-dimensional space and the model, is projected such that the moving object 32 is positioned at the center of the moving object region 52. The model of the other moving object can be obtained from the model information while the direction of the other moving object can be obtained from the second direction information.

When the region according to the model of the moving object 31 and the distance between the moving object 31 and the moving object 1 is identified as the moving object region, the projection may be performed such that a length of the depth of the model projected on the image is a length of a rectangle in a lateral direction while a length of the height of the model projected on the image is a length of the rectangle in the height direction.

The identifier 17 may identify, as the moving object region, a region according to the texture information about the other moving object based on the identified position of the other moving object. For example, when identifying the positions (center positions) of the moving bodies 31 and 32 serving as the other moving bodies as illustrated in FIG. 4, the identifier 17 may identify a moving object region 61 of the moving object 31 and a moving object region 62 of the moving object 32 as illustrated in FIG. 7.

Figure 7:
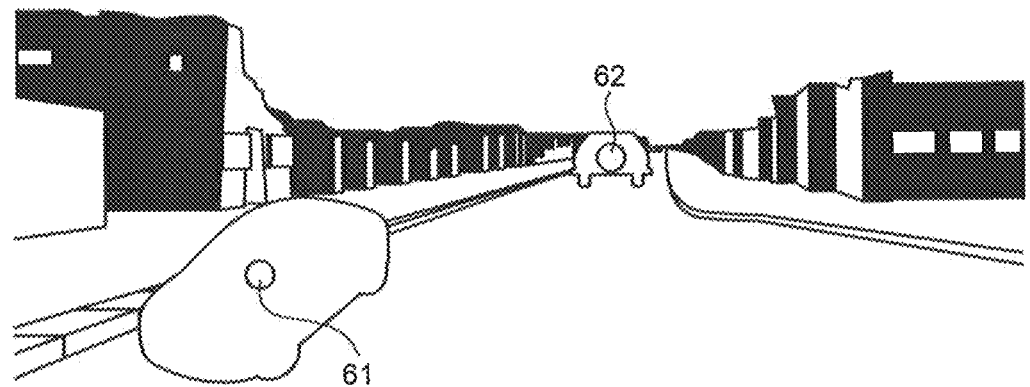
FIG. 7 is an explanatory view illustrating still other example of identifying the moving object regions in the embodiment.

In the example illustrated in FIG. 7, the moving object region 61 is identified according to the texture information about the moving object 31. Specifically, the moving object region 61 has a color the same as or a similar to that indicated by the texture information around the position of the moving object 31. Likewise, the moving object region 62 is identified according to the texture information about the moving object 32. Specifically, the moving object region 62 has a color the same as or a similar to that indicated by the texture information around the position of the moving object 32.

The first estimator 18 estimates the position and the posture of the image capturing unit 5 on the basis of the multiple images acquired by the first acquirer 11. Specifically, the first estimator 18 extracts feature points from the respective images, tracks the feature points among the images, and estimates the position and the posture of the image capturing unit 5. In the embodiment, the first estimator 18 extracts the feature points from non-moving object regions other than the moving object regions in the respective images, tracks the feature points among the images, and estimates the position and the posture of the image capturing unit 5.

Figure 8:
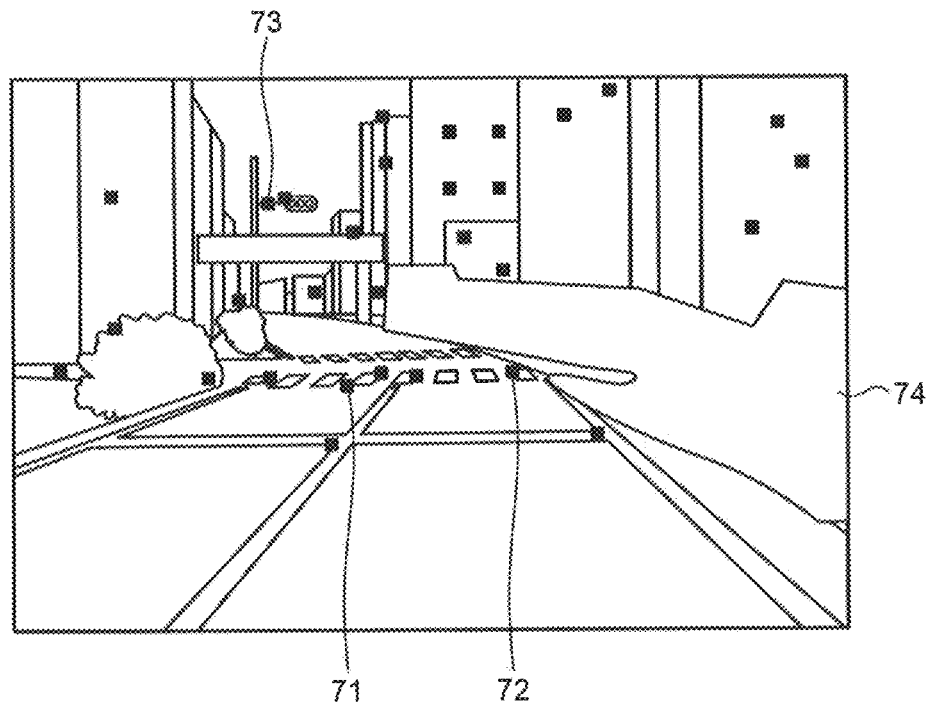
FIG. 8 is an explanatory view illustrating an exemplary technique for tracking feature points in the embodiment.
Figure 9:
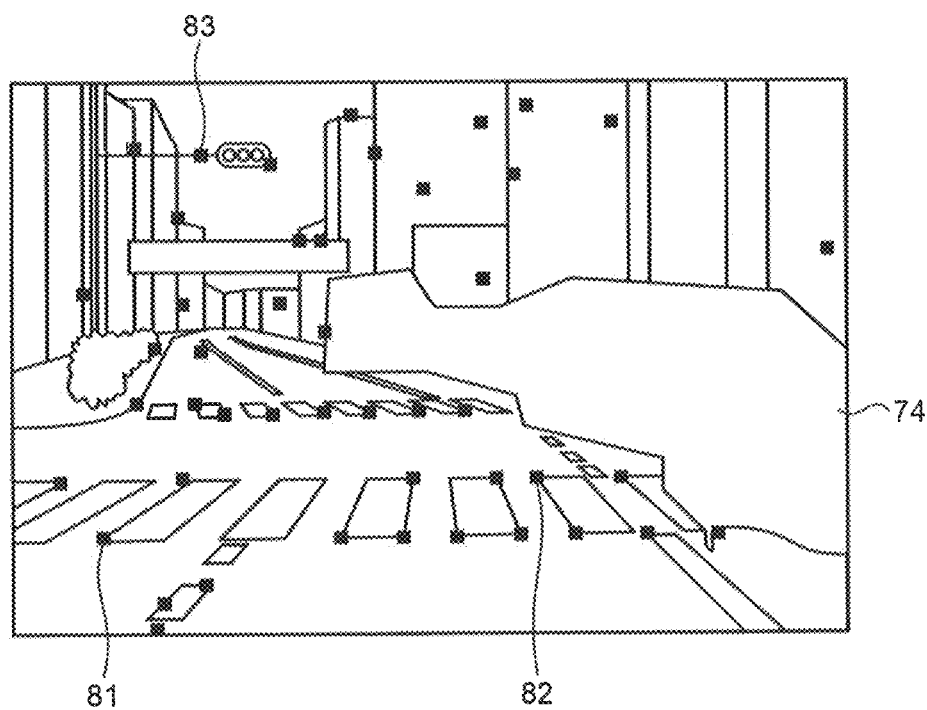
FIG. 9 is an explanatory view illustrating the exemplary technique for tracking the feature points in the embodiment.

FIG. 8 illustrates the image captured at time t−1. FIG. 9 illustrates the image captured at time t. In the examples illustrated in FIGS. 8 and 9, the first estimator 18 extracts the feature points from the non-moving object region other than a moving object region 74 as illustrated in FIG. 8 and tracks the extracted feature points on the image illustrated in FIG. 9. In the examples, the first estimator 18 extracts feature points 71, 72, and 73 from the image illustrated in FIG. 8, tracks the respective feature points 71, 72, and 73 on the image illustrated in FIG. 9, and extracts feature points 81, 82, and 83, respectively, from the image illustrated in FIG. 9. The first estimator 18 obtains a correspondence in time series between the corresponding feature points on the corresponding images for each feature point. The first estimator 18 obtains the position and the posture (current position and posture) of the image capturing unit 5 relative to the position and the posture of the image capturing unit 5 at previous time on the basis of the obtained correspondences of the respective feature points in time series (posture rotation R and parallel movement T) by epipolar geometry.

A point having a large luminance difference in an image (e.g., a point having a large luminance difference both in lateral and longitudinal directions) can be chosen as the feature point. The feature points can be extracted by a known extraction technique such as Harris corner detector.

In the embodiment, a technique that associates the feature points with each other is described as an example of tracking the feature points. The tracking the feature points includes a technique in which a region surrounding a certain pixel is considered as the feature point, and the pixels are associated with each other between the regions or the pixels are associated with each other using the region and the feature point.

The searcher 19 searches for a plurality of sets of the corresponding points among the non-moving object regions in the respective images acquired by the first acquirer 11. Specifically, the searcher 19 arranges search points in the non-moving object region on the image captured at previous time, and searches for corresponding points each correspond to one of the search points on the image captured at this time to determine the sets of the corresponding points.

Figure 10:
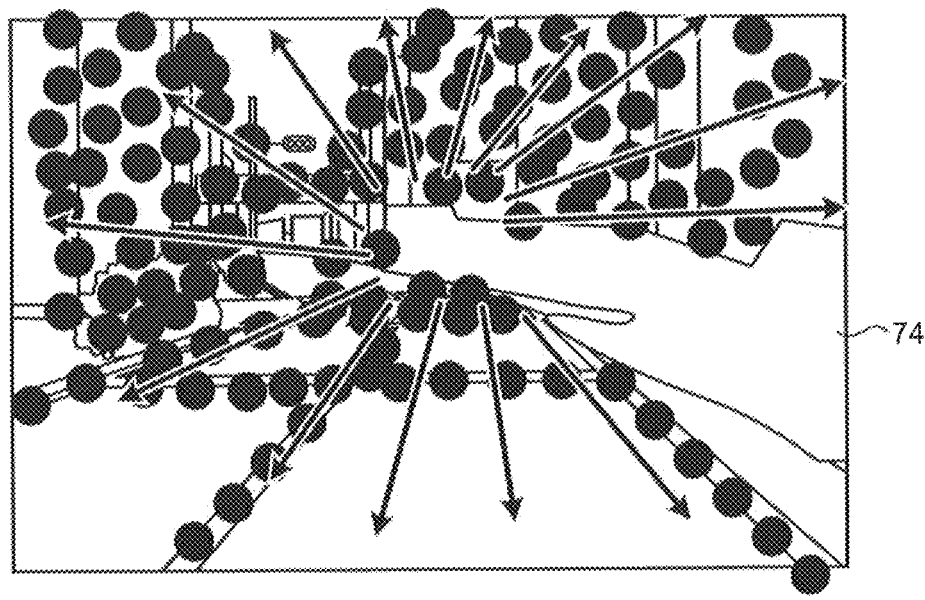
FIG. 10 is an explanatory view illustrating an exemplary technique for searching for corresponding points in the embodiment.

The search points may be arranged in the non-moving object region on the image captured at previous time such that the search points are arranged entirely on the periphery of the non-moving object region or evenly and entirely in the non-moving object region. The searcher 19 can identify a range in which the search points are capable of being observed on the image captured at this time from the position and the posture, which are estimated by the first estimator 18, of the image capturing unit 5, thereby searching the identified range and searching for the corresponding points or the search points. Specifically, the searcher 19 searches for the corresponding points corresponding to the search points on epipolar lines (indicated with the arrows in FIG. 10), on which the search points can be observed as illustrated in FIG. 10.

In the embodiment, the search points are arranged on the image captured at previous time and the corresponding points corresponding to the search points are searched for on the image captured at this time. The search points may be arranged on the image captured at this time and the corresponding points corresponding to the search points may be searched for on the image captured at previous time.

The measurer 21 performs three-dimensional measurement on the basis of the position and the posture, which are estimated by the first estimator 18, of the image capturing unit 5 and the multiple sets of the corresponding points searched for by the searcher 19 to obtain three-dimensional points. Specifically, the measurer 21 performs three-dimensional measurement based on a principle of triangulation using the position and the posture, which are estimated by the first estimator 18, of the image capturing unit 5 and the multiple sets of the corresponding points searched for by the searcher 19. As a result, the measurer 21 restores the depths of the respective corresponding points, thereby obtaining the three-dimensional points.

The second estimator 23 estimates a movement plane on which the moving object 1 moves on the basis of the three-dimensional points obtained by the measurer 21. For estimating the movement plane, a plane detection technique using a random sample consensus (RANSAC), which is a known technique, may be used for example. Specifically, a set of three points having a height equal to or smaller than a second threshold is randomly acquired at several times in a group of the three-dimensional points obtained by the measurer 21, and a plane that includes the largest number of three-dimensional points within a third threshold distance from the plane may be estimated as the movement plane out of the planes each formed by the three points.

The movement plane can be estimated highly accurately using the following technique.

The second estimator 23 sets a fourth threshold on the basis of a time series change in the posture, which is estimated by the first estimator 18, of the image capturing unit 5 (the moving object 1). Specifically, the second estimator 23 sets the fourth threshold such that with an increase in the time series change in the posture of the image capturing unit 5, the value of the fourth threshold is reduced. Specifically, the second estimator 23 sets, to the value of the fourth threshold, a value obtained by applying a value indicating the time series change in the posture of the image capturing unit 5 to a monotonically decreasing function.

For example, let the monotonically decreasing function be $y = -ax + b$ where a and b are any desired variables. In this case, the second estimator 23 calculates an absolute value of a difference between a value indicating the posture of the image capturing unit 5 of the moving object 1 at a present time t and a value indicating the posture of the image capturing unit 5 of the moving object 1 at a calculation time t−P, which is the time P hours before the present time t. The second estimator 23 sets, to the fourth threshold, the value of y obtained by substituting the calculated absolute value of the difference to x of the monotonically decreasing function.

The calculation time t−P is preferably the calculation time of the posture of the image capturing unit 5 at previous time, but is not limited thereto. The calculation time is the calculation time of the posture of the image capturing unit 5 at or before the previous time. The absolute value of the difference is the sum of the absolute values of the differences in roll, pitch, and yaw, for example, but is not limited thereto.

The second estimator 23 extracts a plurality of three-dimensional points each having a distance from the moving object 1 equal to or smaller than the set fourth threshold in the movement direction of the moving object 1 out of the three-dimensional point group obtained by the measurer 21.

Figure 11:
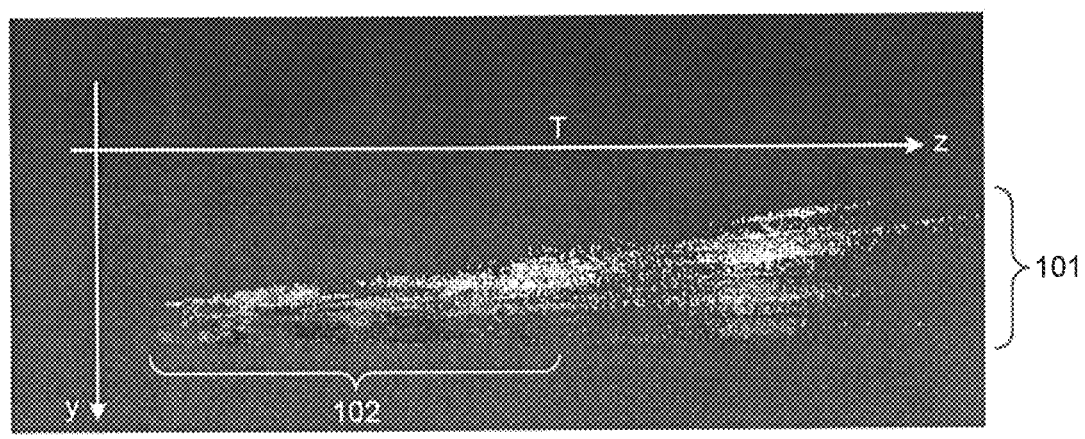
FIG. 11 is an explanatory view illustrating an exemplary technique for extracting three-dimensional points in the embodiment.

FIG. 11 is en explanatory view illustrating an exemplary technique for extracting the three-dimensional points in the embodiment, and illustrates a three-dimensional point group 101 obtained by the measurer 21 on the yz plane. The movement direction of the moving object 1 is the z-axis direction (specifically, +z direction). In the example illustrated in FIG. 11, the second estimator 23 extracts a plurality of three-dimensional points 102 each having a z coordinate value equal to or smaller than the set fourth threshold T out of the three-dimensional point group 101.

The second estimator 23 divides a space in which the extracted three-dimensional points are positioned into a plurality of divided spaces in the movement direction of the moving object 1.

Figure 12:
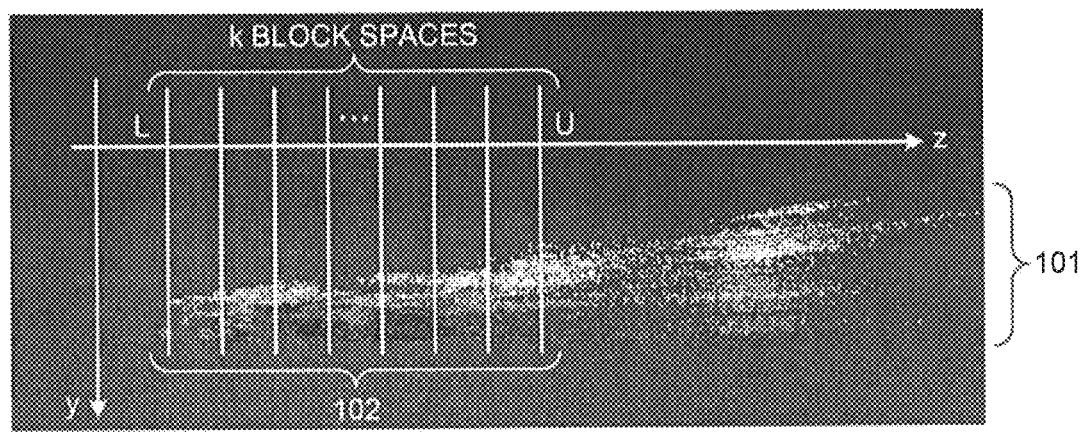
FIG. 12 is an explanatory view illustrating an exemplary technique for dividing a space in the embodiment.

FIG. 12 is an explanatory view illustrating an exemplary technique for dividing the space in the embodiment, and illustrates the three-dimensional point group 101 and the three-dimensional points 102 on the yz plane. In the example illustrated in FIG. 12, the second estimator 23 identifies a minimum value L and a maximum value U out of the z coordinate values of the extracted three-dimensional points 102, and divides a space having an coordinate value equal to or larger than L and equal to or smaller than U equally into k (k≥2) in the z-axis direction to obtain k block spaces. While FIG. 12 exemplifies a case of U=T, it is sufficient if U satisfies a relation of U≤T.

The second estimator 23 selects, for each divided space, a representative point out of the three-dimensional points included in the divided space. Specifically, the second estimator 23 selects, as the representative point, the three-dimensional point at the lowest position in the vertical direction out of the three-dimensional points included in the divided space.

Figure 13:
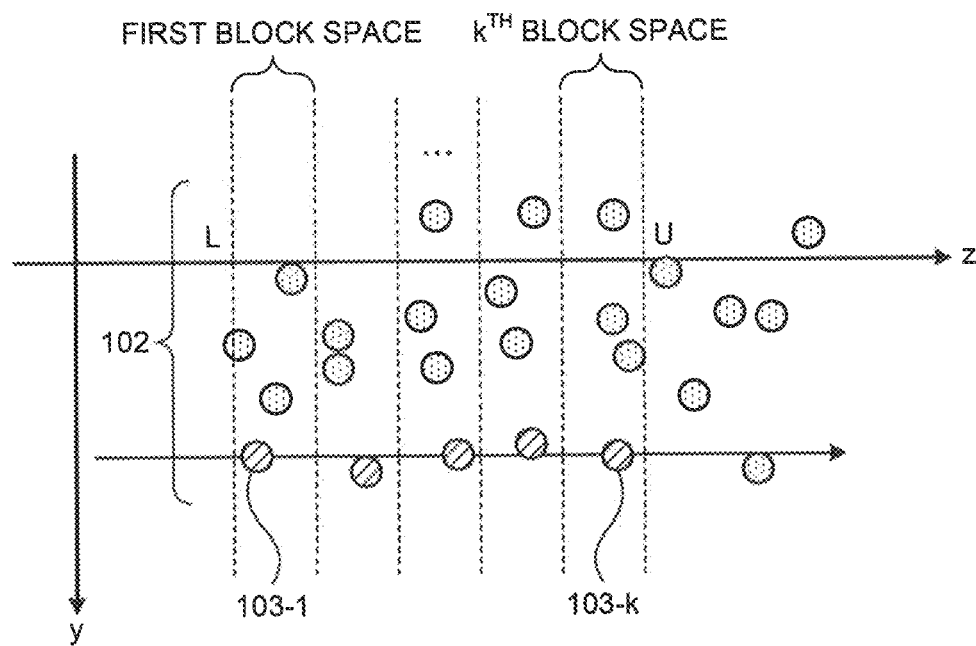
FIG. 13 is an explanatory view illustrating an exemplary technique for selecting a representative point in the embodiment.

FIG. 13 is an explanatory view illustrating an exemplary technique for selecting the representative point in the embodiment, and illustrates the three-dimensional points 102 and the block spaces after the division on the yz plane. In the example illustrated in FIG. 13, the second estimator 23 selects, as the representative point, the three-dimensional point having a maximum y coordinate value in each block space. In a first block space, the second estimator 23 selects three-dimensional point 103-1 as the representative point. In a kth block space, the second estimator 23 selects three-dimensional point 103-k as the representative point.

The second estimator 23 estimates a plane approximated with the selected representative points as the movement plane on which the moving object 1 moves.

Figure 14:
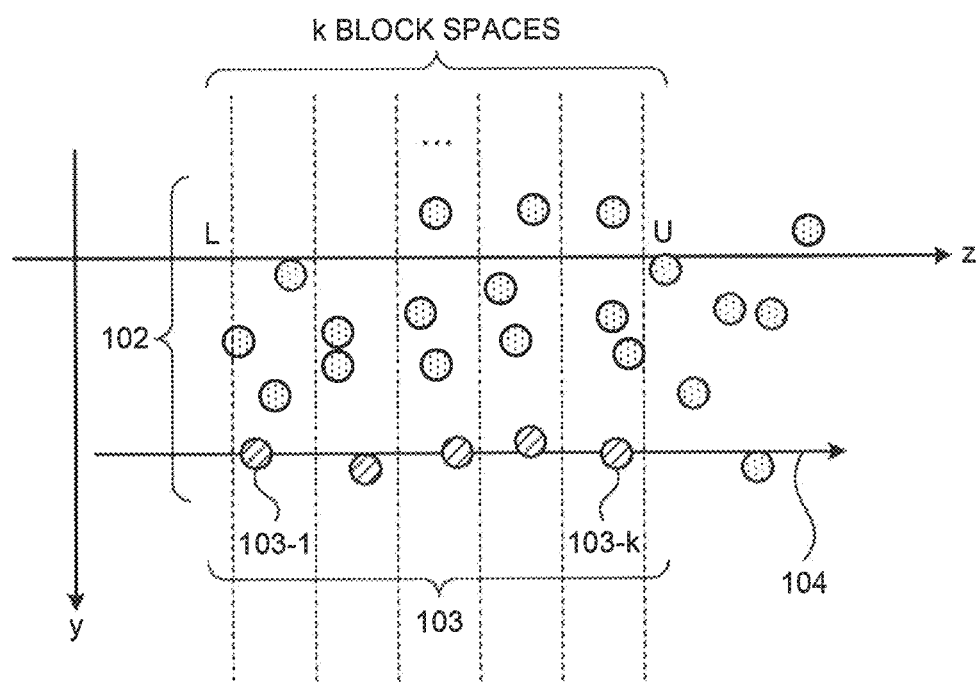
FIG. 14 is an explanatory view illustrating an exemplary technique for estimating a movement plane in the embodiment.

FIG. 1.4 is an explanatory view illustrating an exemplary technique for estimating the movement plane in the embodiment, and illustrates the block spaces after the division and k selected representative points 103 on the yz plane. In the example illustrated in FIG. 14, the second estimator 23 estimates a plane 104 (illustrated as the straight line on the yz plane in FIG. 14) approximated with the k selected representative points 103 as the movement plane on which the moving object 1 moves.

The detector 25 detects an obstacle on the basis of the three-dimensional point group obtained by the measurer 21 and the movement plane estimated by the second estimator 23. Specifically, the detector 25 detects, as an obstacle, the three-dimensional points that are not present on the movement plane out of the three-dimensional point group obtained by the measurer 21.

Figure 15:
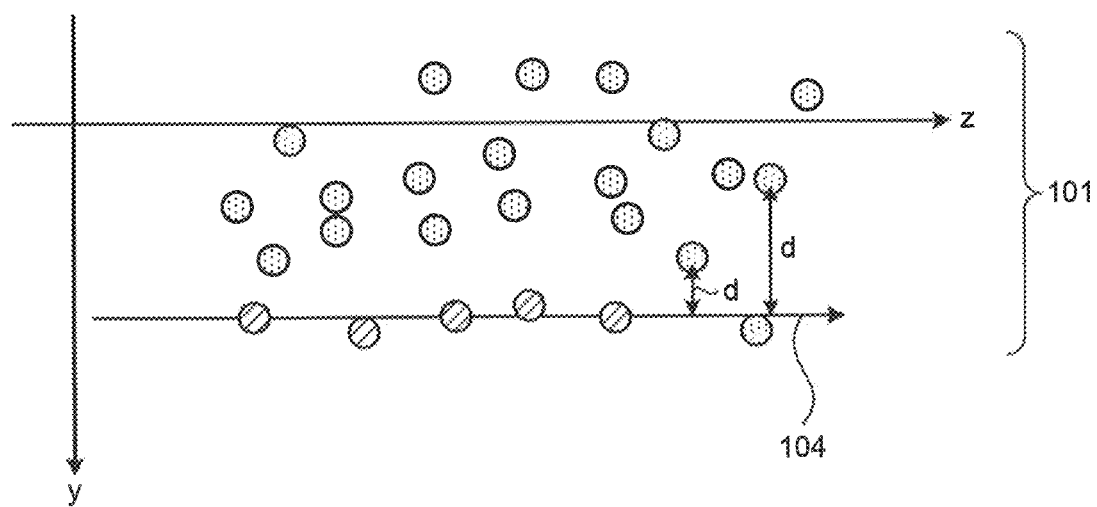
FIG. 15 is an explanatory view illustrating an exemplary technique for detecting an obstacle in the embodiment.

FIG. 15 is an explanatory view illustrating an exemplary technique for detecting the obstacle in the embodiment, and illustrates the three-dimensional point group 101 obtained by the measurer 21 and the movement plane 104 estimated by the second estimator 23 on the yz plane. In the example illustrated in FIG. 15, the detector 25 calculates a distance d from the movement plane 104 in the y-axis direction for each of the three-dimensional points included in the three-dimensional point group 101, and detects the three-dimensional point having a distance d equal to or larger than an error as the three-dimensional point included in the obstacle. The error is a measurement error in the three-dimensional measurement performed by the measurer 21.

The output unit 27 performs output on the basis of the detection result of the detector 25. For example, the output unit 27 causes a speaker (not illustrated) installed in the moving object 1 to output the position of the detected obstacle as a voice, or a display installed in the moving object 1 to display the position of the detected obstacle on an image acquired by the first acquirer 11.

Figure 16:
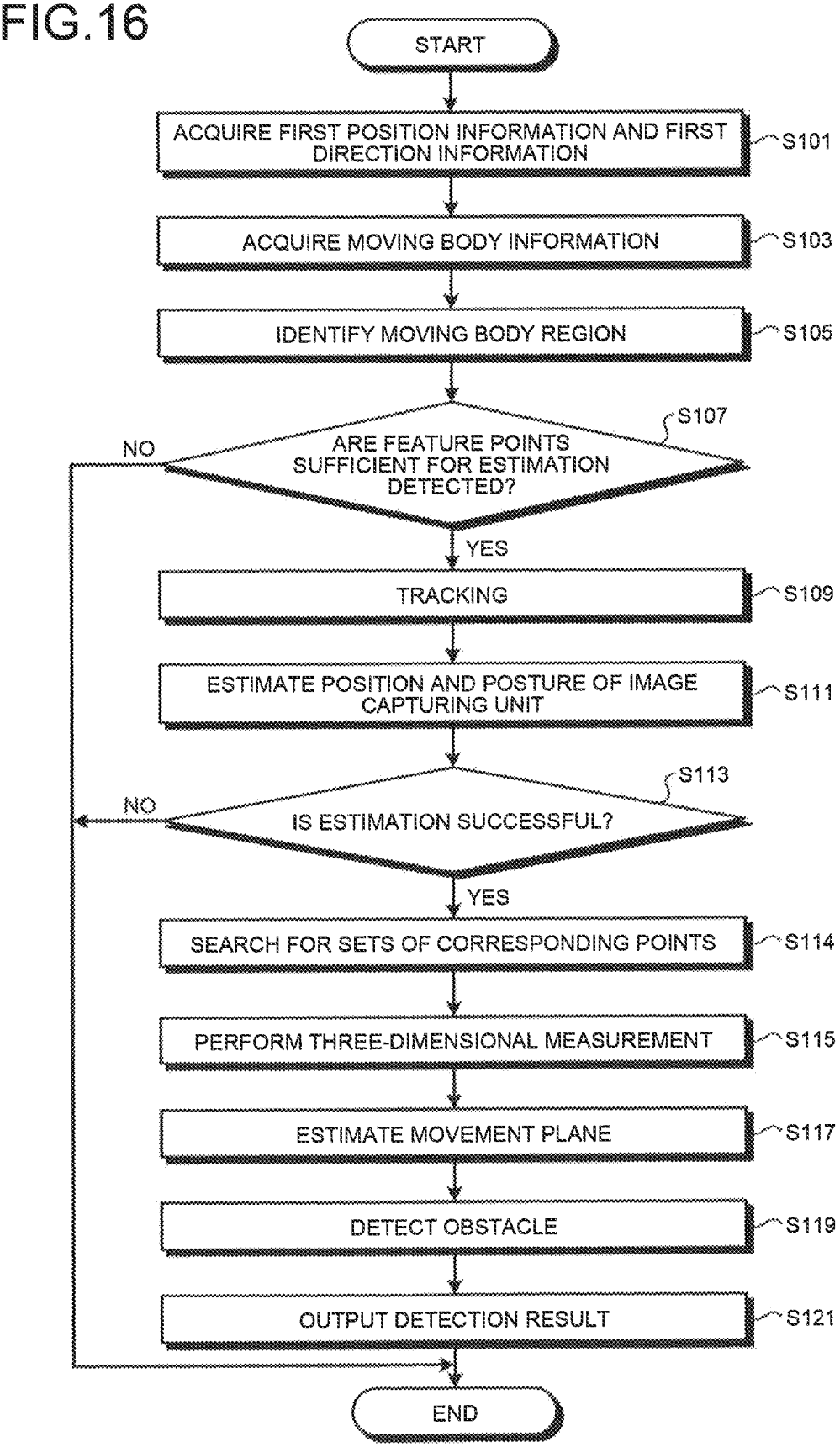
FIG. 16 is a flowchart illustrating exemplary processing in the embodiment.

FIG. 16 is a flowchart illustrating an exemplary flow of a procedure of the processing in the embodiment.

The first acquirer 11 sequentially acquires images captured in time series from the image capturing unit 5 while the second acquirer 13 sequentially acquires the first position information and the first direction information (step S101).

The third acquirer 15 acquires the moving object information about other moving object that moves in the surroundings of the moving object 1 (step S103).

The identifier 17 identifies the moving object region in which the other moving object is present for each of the images acquired by the first acquirer 11 on the basis of the first position information and the first direction information that are acquired by the second acquirer 13 and the moving object information acquired by the third acquirer 15 (step S105).

The first estimator 18 extracts the feature points from the non-moving object regions in the respective images acquired by the first acquirer 11 in order to estimate the position and the posture of the image capturing unit 5. If the feature points sufficient for estimation are extracted (Yes at step S107), the first estimator 18 tracks (perform tracking) the feature points among the images (step S109) and estimates the position and the posture of the image capturing unit 5 (step S111).

If the feature points sufficient for estimation are not extracted (No at step S107) or if the estimation of the position and the posture of the image capturing unit 5 fails (No at step S113), the processing ends.

If the estimation of the position and the posture of the image capturing unit 5 is successful (Yes at step S113), the searcher 19 searches for a plurality of sets of the corresponding points among the non-moving object regions in the respective images acquired by the first acquirer 11 (step S114).

The measurer 21 performs three-dimensional measurement on the basis of the position and the posture, which are estimated by the first estimator 18, of the image capturing unit 5 and the multiple sets of the corresponding points searched for by the searcher 19 to obtain the three-dimensional points (step S115).

The second estimator 23 estimates the movement plane on which the moving object 1 moves on the basis or the three-dimensional point group obtained by the measurer 21 (step S117).

The detector 25 detects an obstacle on the basis of the three-dimensional point group obtained by the measurer 21 and the movement plane estimated by the second estimator 23 (step S119).

The output unit 27 performs output on the basis of the detection result of the detector 25 (step S121).

Figure 17:
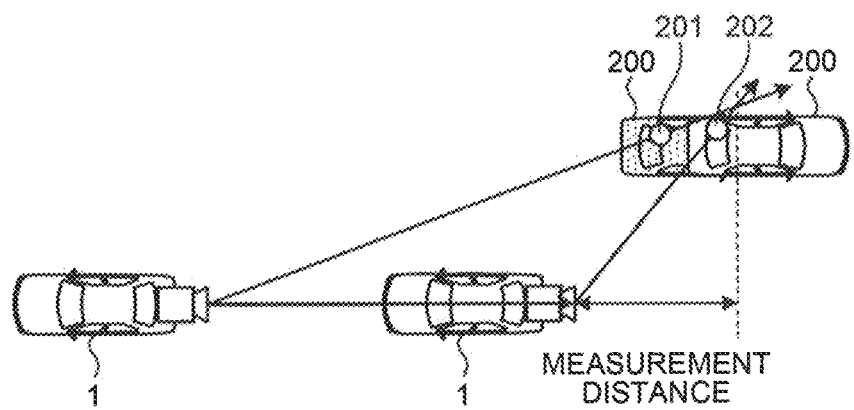
FIG. 17 is an explanatory view illustrating a comparative example of the embodiment.

When the set of the corresponding points is searched for on the image on the basis of a moving object 200 that is moving and serves as other moving object as illustrated in FIG. 17, the position of a search point 201 of the moving object 200 at previous image capturing time and the position of a corresponding point 202 of the moving object 200 at this image capturing time differ from each other. If the three-dimensional measurement is performed using the set of the search point 201 and the corresponding point 201 as the set of the corresponding points, the three-dimensional point (specifically, the depth) cannot be accurately obtained due to the principle of triangulation.

Figure 18:
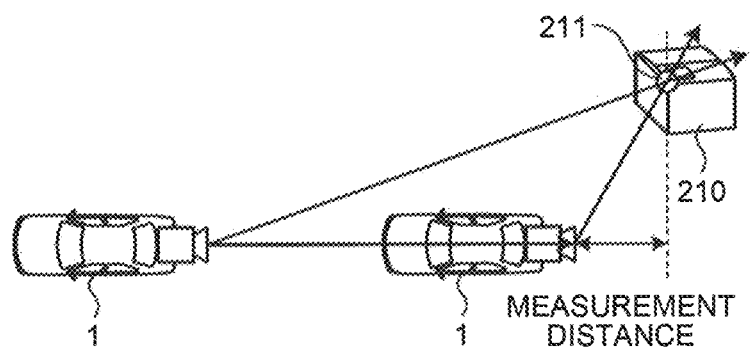

In contrast, when the set of the corresponding points are searched for on the image on the basis of a non-moving object 210 that does not move such as an object as illustrated in FIG. 18, a difference hardly occurs between the position of a search point 211 on the non-moving object 210 at previous image capturing time and the position of a corresponding point 211 on the non-moving object 210 at this image capturing time. As a result, when the three-dimensional measurement is performed using the set of the search point 211 and the corresponding point 211 as the set of the corresponding points, the three-dimensional point (specifically, the depth) can be accurately obtained in the principle of triangulation.

The embodiment searches for the sets of the corresponding points among a plurality of images on the basis of the non-moving object regions other than the moving object regions in the respective images, thereby making it possible to search for the sets of the corresponding points excluding the moving object (other moving object). As a result, deterioration of accuracy of three-dimensional measurement can be reduced.

The embodiment can reduce the deterioration of accuracy of three-dimensional measurement as described above. When an obstacle is detected using the three-dimensional points thus obtained, detection accuracy of the obstacle can be increased. For example, a tiny obstacle having a height about 10 cm can be accurately detected.

In the embodiment, as the change in the posture of the moving object increases, the threshold is reduced, thereby hardly deteriorating the accuracy of three-dimensional measurement due to the influence of the change in posture of the moving object even when the change increases. Furthermore, the movement plane of the moving object is estimated using the three-dimensional points near the moving object, thereby making it possible to increase the accuracy of estimating the movement plane.

The embodiment can increase the accuracy of estimating the movement plane as described above. When an obstacle is detected using the movement plane thus estimated, the detection accuracy of the obstacle can be more increased.

In the embodiment, the feature points are extracted from the non-moving object regions when the position and the posture of the image capturing unit 5 are estimated. As a result, the positions of the feature points to be tracked hardly shift. Consequently, the deterioration of accuracy of estimating the position and the posture of the image capturing unit 5 can also be reduced.

Modification

In the embodiment, the three-dimensional points each having a distance (distance in the height direction) equal to or larger than the error from the movement plane are detected as the three-dimensional points included in the obstacle. The three-dimensional points each having a distance (distance in the height direction) equal to or larger than the error from the movement plane and equal to or smaller than a fifth threshold may be detected as the three-dimensional points included in the obstacle. In this case, when the fifth threshold is set to the height (distance) nearly the same as the height of the moving object 1, obstacles such as a traffic signal and a pedestrian bridge are prevented from being mistakenly detected as the obstacles.

Hardware Structure

Figure 19:
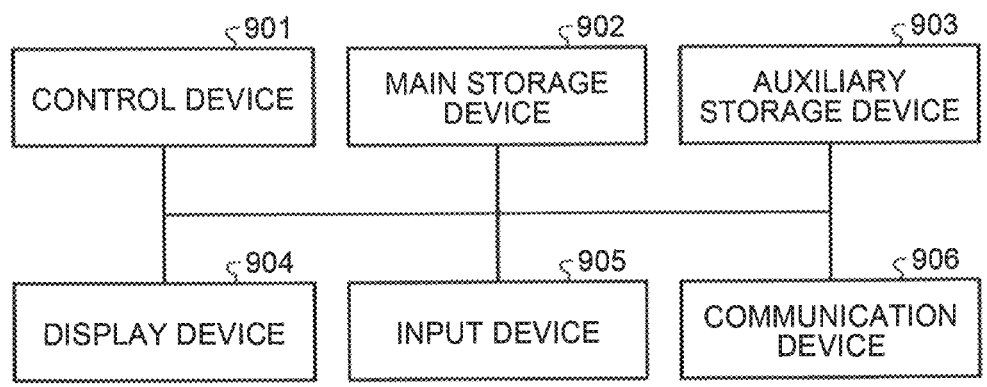
FIG. 19 is a schematic diagram illustrating an exemplary hardware structure of the measurement device in the embodiment.

FIG. 19 is a schematic diagram illustrating an exemplary hardware structure of the measurement device of the embodiment and the modification. As illustrated in FIG. 19, the measurement device of the embodiment and the modification has a hardware structure utilizing a normal computer. Specifically, the measurement device includes a control device 901 such as a CPU, a main storage device 902 such as a read only memory (ROM) or a random access memory (RAM), an auxiliary storage device 903 such as a hard disk drive (HDD) or a solid state drive (SSD), a display device 904 such as a display, an input device 905 such as a keyboard or a mouse, and a communication device 906 such as a communication interface.

A program executed by the measurement device in the embodiment and the modification is stored and provided in a computer-readable storage medium, which may be provided as a computer program product, such as a compact disc read only memory (CD-ROM), a compact disc recordable (CD-R), a memory card, a digital versatile disc (DVD), or a flexible disk (FD), as an installable or executable file.

The program executed by the measurement device in the embodiment and the modification may be stored in a computer connected to a network such as the Internet and provided by being downloaded via the network. Furthermore, the program executed by the measurement device in the embodiment and the modification may be provided or distributed via a network such as the Internet. The program executed by measurement device in the embodiment and the modification may be embedded and provided in a ROM, for example.

The program executed by the measurement device in the embodiment and the modification has a module structure that achieves the respective units described above in a computer. In practical hardware, the CPU reads out the program from the ROM or the HDD to the RAM so as to execute the program, so that the respective units described above are achieved in the computer.

The present invention is not directly limited to the embodiment and the modification. The invention can be embodied by changing components without departing from the spirit and scope of the invention when practiced. In addition, various aspects of the invention can be made by properly combining the components of the embodiment and the modification. For example, some components may be eliminated from all of the components of the embodiment and the modification. Furthermore, the components of the different embodiments and modifications may be properly combined.

For example, the steps in the flowchart of the embodiment may be changed in execution order, some steps may be executed simultaneously, or the steps may be executed in different order every implementation without departing from their roles.

The embodiment and modification can prevent the deterioration of accuracy of three-dimensional measurement even when other moving object is present in a plurality of images captured in time series.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A measurement device comprising:
processing circuitry configured to:
    acquire a plurality of images captured in time series by an image capturing unit installed in a moving object;
    acquire first position information that indicates a position of the moving object and first direction information that indicates a direction of the moving object;
    acquire, through a communication device separated from the moving object by performing road-vehicle communication, moving object information that includes second position information indicating a position of other moving object moving in surroundings of the moving object;
    identify a moving object region in which the other moving object is present for each of the images, based on the first position information, the first direction information, and the moving object information;
    estimate a position and a posture of the image capturing unit based on the images;
    search for a plurality of sets of corresponding points among non-moving object regions other than the moving object regions in the respective images; and
    perform three-dimensional measurement based on the position and the posture of the image capturing unit and the sets of the corresponding points;
    estimate a movement plane on which the moving object moves based on a three-dimensional point group that is obtained as a result of performing the three-dimensional measurement; and detect an obstacle based on the three-dimensional point group and the movement plane,
wherein the three-dimensional point group is obtained by extracting three-dimensional points each having a distance from the moving object equal to or smaller than a threshold in a movement direction of the moving object, the threshold being set such that with an increase in a time series change in the posture of the image capturing unit, the threshold is reduced.

2. The device according to claim 1, wherein
in estimating, the processing circuitry is configured to extract feature points from the respective images, tracks the feature points among the images, and estimates the position and the posture of the image capturing unit.

3. The device according to claim 2, wherein
in estimating, the processing circuitry is configured to extract the feature points from the non-moving object regions of the respective images, tracks the feature points among the images, and estimates the position and the posture of the image capturing unit.

4. The device according to claim 1, wherein the non-moving object regions each have a predetermined size based on the position of the other moving object.

5. The device according to claim 1, wherein the non-moving object regions each have a size according to a distance between the moving object and the other moving object based on the position of the other moving object.

6. The device according to claim 1, wherein
the moving object information further includes model information that indicates a model obtained by abstracting a shape of the other moving object, and
the non-moving object regions each correspond to a region calculated based at least in part on the model of the other moving object and the position of the other moving object.

7. The device according to claim 6, wherein
the moving object information further includes second direction information that indicates a direction of the other moving object, and
the non-moving object regions each further correspond to the region calculated based at least in part on the direction of the other moving object and the position of the other moving object.

8. The device according to claim 1, wherein
the moving object information further includes texture information that indicates at least one of a color and a pattern of the other moving object, and
the non-moving object regions each correspond to a region calculated based at least in part on the texture information about the other moving object and the position of the other moving object.

9. The device according to claim 1, wherein
in detecting, the processing circuitry is configured to detect, as the obstacle, a three-dimensional point that is not present on the movement plane out of the three-dimensional point group.

10. The device according to claim 1, wherein
in acquiring the moving object information, the processing circuitry is configured to acquire the moving object information from the other moving object.

11. The device according to claim 1, wherein
in acquiring the moving object information, the processing circuitry is configured to acquire the moving object information from a monitoring device that monitors the moving object and the other moving object.

12. A measurement method comprising:
acquiring a plurality of images captured in time series by an image capturing unit installed in a moving object;
acquiring first position information that indicates a position of the moving object and first direction information that indicates a direction of the moving object;
acquiring, through a communication device separated from the moving object by performing road-vehicle communication, moving object information that includes second position information indicating a position of other moving object moving in surroundings of the moving object;
identifying a moving object region in which the other moving object is present for each of the images based on the first position information, the first direction information, and the moving object information;
estimating a position and a posture of the image capturing unit based on the images;
searching for a plurality of sets of corresponding points among non-moving object regions other than the moving object regions in the respective images; and
performing three-dimensional measurement based on the position and the posture of the image capturing unit and the sets of the corresponding points;
estimating a movement plane on which the moving object moves based on a three-dimensional point group that is obtained as a result of performing the three-dimensional measurement; and
detecting an obstacle based on the three-dimensional point group and the movement plane,
wherein the three-dimensional point group is obtained by extracting three-dimensional points each having a distance from the moving object equal to or smaller than a threshold in a movement direction of the moving object, the threshold being set such that with an increase in a time series change in the posture of the image capturing unit, the threshold is reduced.

13. A measurement device comprising:
a processor; and
a memory that stores processor-executable instructions that, when executed by the processor, cause the processor to:
acquire a plurality of images captured in time series by an image capturing unit installed in a moving object;
acquire first position information that indicates a position of the moving object and first direction information that indicates a direction of the moving object;
acquire, through a communication device separated from the moving object by performing road-vehicle communication, moving object information that includes second position information indicating a position of other moving object moving in surroundings of the moving object;
identify a moving object region in which the other moving object is present for each of the images, based on the first position information, the first direction information, and the moving object information;
estimate a position and a posture of the image capturing unit based on the images;
search for a plurality of sets of corresponding points among non-moving object regions other than the moving object regions in the respective images; and
perform three-dimensional measurement based on the position and the posture of the image capturing unit and the sets of the corresponding points;

estimate a movement plane on which the moving object moves based on a three-dimensional point group that is obtained as a result of performing the three-dimensional measurement; and detect an obstacle based on the three-dimensional point group and the movement plane, wherein the three-dimensional point group is obtained by extracting three-dimensional points each having a distance from the moving object equal to or smaller than a threshold in a movement direction of the moving object, the threshold being set such that with an increase in a time series change in the posture of the image capturing unit, the threshold is reduced.

* * * * *